(12) United States Patent
Röder

(10) Patent No.: US 11,136,133 B2
(45) Date of Patent: Oct. 5, 2021

(54) PASSENGER DOOR ARRANGEMENT FOR AN AIRCRAFT SEGMENT

(71) Applicant: Airbus Operations GmbH, Hamburg (DE)

(72) Inventor: Michael Röder, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 109 days.

(21) Appl. No.: 16/556,479

(22) Filed: Aug. 30, 2019

(65) Prior Publication Data
US 2020/0070987 A1    Mar. 5, 2020

(30) Foreign Application Priority Data

Aug. 31, 2018  (DE) .......................... 102018121360.3
Aug. 31, 2018  (DE) .......................... 102018121363.8
Nov. 30, 2018  (DE) .......................... 102018130483.8

(51) Int. Cl.
*B64D 25/08*  (2006.01)
*B64C 1/14*   (2006.01)
*B64D 25/14*  (2006.01)

(52) U.S. Cl.
CPC ............ *B64D 25/08* (2013.01); *B64C 1/1423* (2013.01); *B64C 1/1461* (2013.01); *B64D 25/14* (2013.01)

(58) Field of Classification Search
CPC ... B64C 1/1423; B64C 1/1461; B64C 1/1407; B64D 25/14; B64D 25/08
See application file for complete search history.

(56) References Cited

U.S. PATENT DOCUMENTS

| | | | |
|---|---|---|---|
| 4,927,098 A | | 5/1990 | Depeige |
| 5,106,036 A | * | 4/1992 | Sepstrup ................ B64D 25/14 244/129.1 |
| 5,738,303 A | * | 4/1998 | Hamatani ............. B64D 25/14 244/129.1 |
| 2020/0071978 A1 | * | 3/2020 | Holtrup ................. B64C 1/1407 |
| 2020/0346768 A1 | * | 11/2020 | Romec ................. B64C 1/1407 |

FOREIGN PATENT DOCUMENTS

DE    2029167 A    12/1971

OTHER PUBLICATIONS

German Search Report; priority document.

* cited by examiner

*Primary Examiner* — Joshua J Michener
*Assistant Examiner* — Cindi M Curry
(74) *Attorney, Agent, or Firm* — Greer, Burns & Crain, Ltd.

(57) ABSTRACT

A passenger door arrangement for an aircraft segment, which arrangement comprises a passenger door, which is configured to assume a raised state and a lowered state, and a "girt bar," for arming and disarming an escape slide, the girt bar not altering its position relative to the passenger door in the transition from disarming to arming, when the passenger door is in the lowered state. Additionally an aircraft segment, which comprises the passenger door portion and a fuselage portion, an external engagement arrangement being fixed to the fuselage portion.

6 Claims, 3 Drawing Sheets

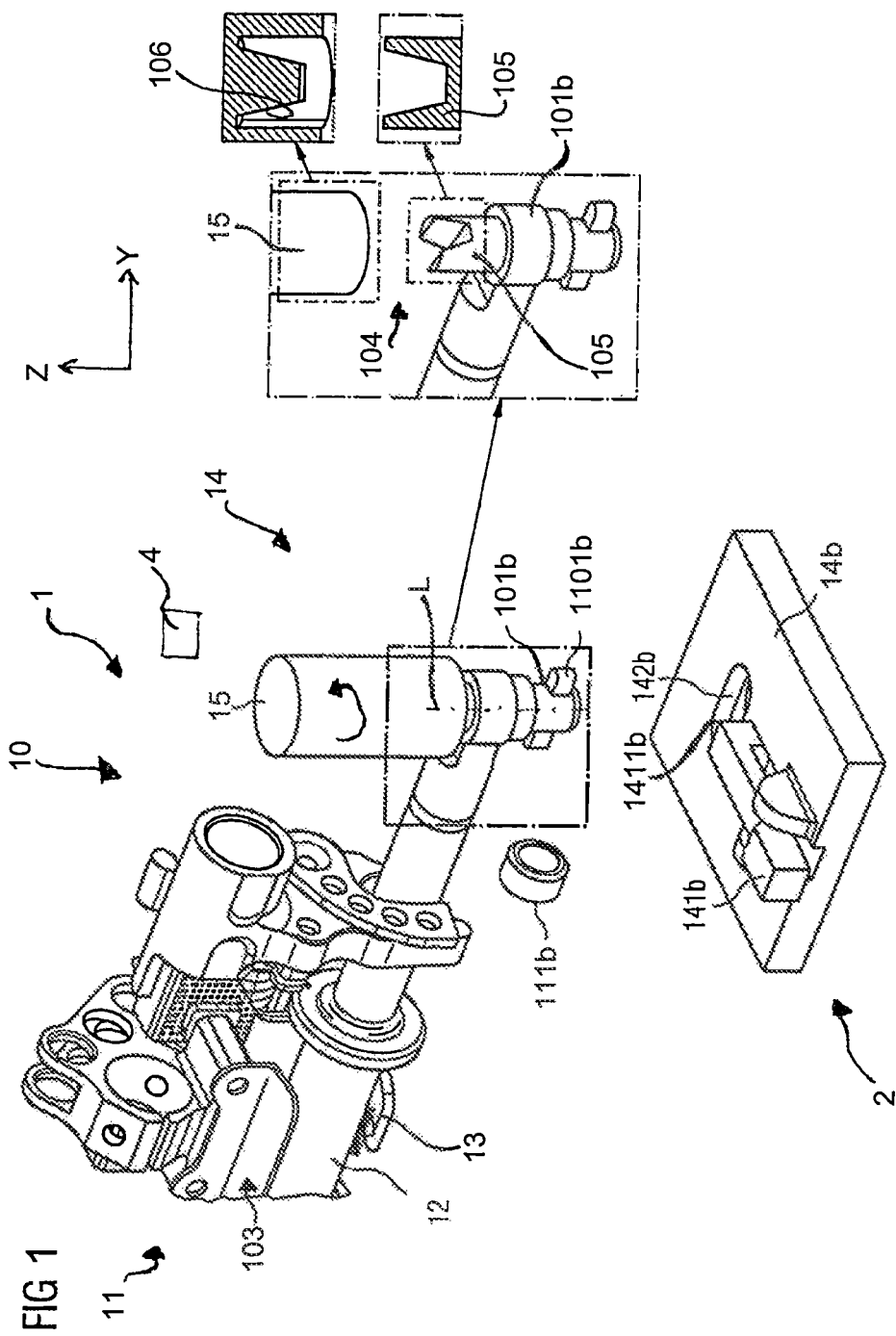

PASSENGER DOOR ARRANGEMENT FOR AN AIRCRAFT SEGMENT

CROSS-REFERENCES TO RELATED APPLICATIONS

This application claims the benefit of the German patent application No. 10 2018 121 363.8 filed on Aug. 31, 2018, German patent application No. 10 2018 121 360.3 filed on Aug. 31, 2018, and German patent application No. 10 2018 130 483.8 filed on Nov. 30, 2018, the entire disclosures of which are incorporated herein by way of reference.

FIELD OF THE INVENTION

The present invention relates to a passenger door arrangement for an aircraft segment, which arrangement, in particular, comprises an escape slide kinematics, driven by a Bowden cable, having non-movable transfer of a main interface component realized, for example, in the form of a girt bar, by means of a rotational movement of a securing pin, or locking bolt. The invention additionally relates to an aircraft segment equipped with such a passenger door arrangement.

BACKGROUND OF THE INVENTION

When the passenger door of a commercial aircraft is closed, locked and secured, an escape slide can usually be armed manually from inside by a selector lever mechanism provided in the region of an inner side of the passenger door. A girt bar functions as a main interface portion, when the escape slide is connected to the girt bar. When the escape slide is in the armed state, the girt bar, as a result of movement of the girt bar itself, engages in a fuselage portion that accommodates the passenger door and that is realized, for example, in the form of a door frame portion. When the passenger door is then opened in the emergency situation, the girt bar is released from the passenger door by the lifting movement, but remains in engagement with the fuselage portion. The escape slide is thereby securely attached to the aircraft structure for use.

Moreover, during the raising of the passenger door, a frame of the girt bar can be moved back into the closed position, by means of spring force, by a fuselage-side device, such that a possible inwardly directed movement of the girt bar is prevented.

SUMMARY OF THE INVENTION

The present invention is directed towards an object of specifying a passenger door arrangement for an aircraft segment, and an aircraft segment, that are equipped with an escape slide securing system of a simple and space-saving design.

Provided in a first aspect is a passenger door arrangement for an aircraft segment having a passenger door. The passenger door can be moved, relative to a fuselage portion that accommodates the passenger door, between a raised position and a lowered position. The fuselage portion may be realized, for example, in the form of a door frame, and have a door opening that accommodates the passenger door. The passenger door arrangement additionally comprises a "girt bar," for arming or disarming an escape slide. The girt bar can be connected to the passenger door and/or to the fuselage portion by a connection arrangement. Accordingly, an escape slide connected to the girt bar can optionally be connected to the passenger door and/or to the fuselage portion by means of the connection arrangement.

The connection arrangement is configured, in the case of arming of the girt bar, to hold the girt bar fixed relative to the passenger door when it is in its lowered position. In other words, in the case of the passenger door arrangement, in the transition from disarming to arming of the escape slide, when the passenger door is in the lowered state, the position of the girt bar relative to the passenger door is not altered.

The passenger door arrangement avoids a complex interface between passenger door, girt bar and fuselage, which can result in difficult or complex handling, and also in interruptions during production and servicing. In particular, it is possible to dispense with a complex kinematics resulting from the transfer of the girt bar between the passenger door and the escape slide. The escape slide securing system of the passenger door arrangement is therefore lightweight, of simple design, and robust in respect of handling and tolerances.

Preferably, the connection arrangement is configured to connect the girt bar to the passenger door when the escape slide is in the disarmed state. Unintentional deployment of the escape slide upon opening of the passenger door is thereby reliably avoided. In addition or as an alternative to this, the connection means is configured to connect the girt bar to the fuselage portion when the escape slide is in the armed state. It is thereby ensured that, in an emergency situation, the escape slide is securely connected to the fuselage portion and is fully operational.

In a first design of the first aspect, the connection arrangement preferably comprises a mechanism that is configured to releasably lock and fix the girt bar to an external engagement means. The external engagement means can preferably be fastened to the fuselage portion.

For example, the mechanism of the connection arrangement may be connected to the girt bar in such a manner that the mechanism does not alter its position relative to the girt bar. Additionally or alternatively, the mechanism is preferably configured to be fastened to the passenger door when the passenger door is in the raised state, before and during the transition from disarming to arming of the escape slide, when the passenger door is in the lowered state. In addition, the mechanism may be configured, and is preferably configured, to release itself from the passenger door following arming of the escape slide, when the passenger door is in the raised state.

In a second design of the first aspect, the passenger door arrangement preferably additionally comprises an actuating element, which, at one end is connected, for example via a Bowden cable, to a selector lever mechanism provided in the region of an inner side of the passenger door arrangement, and at its other end is connected to the connection arrangement, i.e., to the mechanism of the connection arrangement, and which is configured to activate and ensure the arming or disarming of the escape slide. When the door arrangement has been mounted in the aircraft segment, the selector lever mechanism is accessible to a user, for example a flight attendant, present in an aircraft cabin.

In a third design of the first aspect, the mechanism is preferably a locking bolt, which is attached to the end of the girt bar and which is configured to go into rotational engagement with the external engagement means. The connection arrangement preferably comprises a positioning element, which is fastened to the passenger door and which is configured to put the external engagement means into a state of readiness to receive the rotational engagement of the locking bolt, when the passenger door is in the lowered state.

Provided in a second aspect is an aircraft segment, which comprises the passenger door arrangement, described above, and the fuselage portion, the external engagement means being fixed to the fuselage portion.

The passenger door portion of the aircraft segment may be embodied according to the third design of the first aspect, wherein preferably:

the external engagement means comprises an oblong hole, and the locking bolt comprises at least two projections, which are configured, in order so that they are, when the passenger door is in the lowered state, in the transition from disarming to arming, to go into rotational engagement with the oblong hole; and/or the external engagement means additionally comprises a tilt element, which comprises a first end, on one side of the lever arm, and a second end, on the other side of the lever arm, the first end of the tilt element being arranged opposite the positioning element, the second end of the tilt element projecting into the oblong hole and being configured to negate the state of readiness to receive the rotational engagement of the locking bolt, and the positioning element being configured, in the case of lowering of the passenger door, before the transition from disarming to arming of the escape slide, to press the first end of the tilt element downward, such that the second end of the tilt element is raised in order to establish the state of readiness to receive the rotational engagement of the locking bolt; and/or the second end of the tilt element additionally comprises a recess, which in its shape corresponds to one of the projections of the locking bolt, and the recess is configured, in the case of lowering of the passenger door, following the transition from disarming to arming of the escape slide, to go into engagement with the one of the projections, such that the locking bolt is fixed.

BRIEF DESCRIPTION OF THE DRAWINGS

The accompanying drawings show an exemplary embodiment of the invention, to which, however, the present invention is not to be limited in any manner. In the drawings, elements that are the same or similar are denoted by the same references. It is to be pointed out that the representation of individual elements does not preclude the possibility that the respective fundamental functionality can be implemented in a plurality of elements. There are shown:

FIG. 1 is a schematic sketch of an aircraft segment, realized according to an exemplary embodiment of the present invention, which comprises a passenger door arrangement equipped with an escape slide kinematics.

Figure 2A:
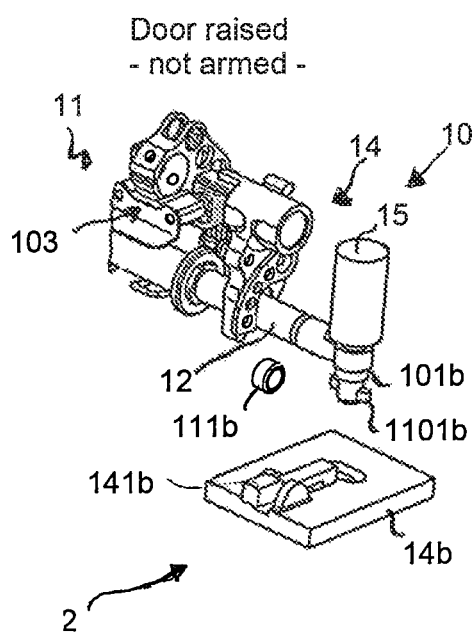
FIGS. 2a-2d are an application of the escape slide kinematics illustrated in FIG. 1, in four steps, for arming of the escape slide, a passenger door of the passenger door arrangement being at first in a raised position.

In the following description, for the purpose of explanation, but not limitation, specific details are described in order to ensure a basic understanding of the technique presented here. For the average person skilled in the art, it is evident that the present technique may be implemented in other exemplary embodiments that differ from these specific details.

DETAILED DESCRIPTION OF THE PREFERRED EMBODIMENTS

FIG. 1 shows an aircraft segment 1 equipped with a passenger door arrangement 10, the outer shapes of the passenger door arrangement 10 and of the aircraft segment 1 being indicated only schematically. The passenger door arrangement 10 comprises a passenger door 11, likewise indicated only schematically, which is configured to assume a raised state and a lowered state. In particular, the passenger door 11 can be moved, relative to a fuselage portion 2 of the aircraft segment 1 that accommodates the passenger door 11 and that, for example, may be realized in the form of a door frame provided with a door opening, and that is likewise indicated only schematically in FIG. 1, between a raised positioned and a lowered position.

The passenger door arrangement 10 additionally comprises a girt bar 12 for arming or disarming an escape slide 13. For this purpose, the girt bar 12, as a main interface part, is connected to the escape slide 13, which in FIG. 1 is likewise indicated only schematically. The girt bar 12 can be connected to the passenger door 11 and/or to the fuselage portion 2 by a connection arrangement 14, which is illustrated in detail in FIG. 1. Represented in an upper region of FIG. 1 are components of the connection arrangement 14 on the passenger door side, i.e. components assigned to the passenger door 11, while a lower region of FIG. 1 shows components of the connection arrangement 14 on the fuselage portion side, i.e., components assigned to the fuselage portion 2.

In the case of the passenger door arrangement 10, the position of the girt bar 12 relative to the passenger door 11 is invariable in the transition from disarming to arming of the escape slide 13, when the passenger door 11 is in the lowered state. In other words, in the case of arming of the escape slide 13, the girt bar 12 is held fixed by the connection arrangement 14, relative to the passenger door 11 when in its lowered position. As is explained in yet greater detail in the following, the connection means 14 is configured to connect the girt bar 12 to the passenger door 11 when the escape slide 13 is in the disarmed state. When the escape slide 13 is in the armed state, by contrast, the connection arrangement 14 connects the girt bar 12 to the fuselage portion 2.

The connection arrangement 14 of the passenger door arrangement 10 comprises a mechanism 101b, which is configured to releasably lock and fix the girt bar 12 to an external engagement means 14b of the connection arrangement 14 that is fastened to the fuselage portion 2. It is to be emphasized that the mechanism 101b is a constituent part of the passenger door 11, and not of the fuselage portion 2, of another part of the fuselage or of a cabin floor. The mechanism 101b is connected to the girt bar 12 in such a manner that the mechanism 101b does not alter its position relative to the girt bar 12 (cf. FIGS. 2a-2d).

When the passenger door 11 is in the raised state, before and during the transition from disarming to arming of the escape slide 13, when the passenger door 11 is in the lowered state, the mechanism 101b is fastened to the passenger door 11. However, following arming of the escape slide 13, when the passenger door 11 is in the raised state, the mechanism 101b is configured to release itself from the passenger door 11.

The passenger door arrangement 10 additionally comprises an actuating element 15, which, at one end, via a Bowden cable that is not shown in the figures, is connected to a selector lever mechanism 4 attached in the region of an inner side of the passenger door arrangement 10, and at its other end is connected to the mechanism 101a of the connection arrangement 14 forming the escape slide securing system. Upon actuation of the selector lever mechanism 4, a rotational actuating force is transferred, via the Bowden cable, to the actuating element 15, as a result of which arming or disarming of the escape slide 13 is triggered and ensured.

In the exemplary embodiment of the passenger door arrangement 10 shown in the figures, the mechanism 101*b* is implemented in the form of a locking bolt 101*b* attached at one end of the girt bar 12. The locking bolt 101*b* comprises two projections (or pins) 1011*b*. The external engagement means 14*b* comprises an oblong hole 142*b*, the oblong hole 142*b* corresponding in its dimensions to the shape of the two projections 1011*b*, in such a manner that the two projections 1011*b* can pass through the oblong hole 142*b* without collision. It is likewise possible, however, to provide in the oblong hole 142*b*, for example, corresponding recesses in which the projections 1101*b* can engage.

The components of the connection arrangement 14 on the passenger door side additionally comprise a positioning element 111*b*, realized here as a roller, which is fastened to the passenger door 11. On the fuselage portion side, on the other hand, the connection arrangement 14, i.e., the external engagement means 14*a*, comprises a tilt element 141*b*, which comprises a first end, on one side of the lever arm, and a second end, on the other side of the lever arm. The first end of the tilt element 141*b* is arranged opposite the positioning element 111*b* (i.e., in alignment in the downward movement). The second end of the tilt element 141*b*, however, projects into the oblong hole 142*b*. At its second end, the tilt element 141*b* is provided with a recess 1411*b* (see, in particular, FIG. 2*d*, plan view A from below), which in its shape corresponds to one of the projections 1101*b* of the locking bolt.

In the following, the functioning of the escape slide 13 kinematics, and in particular of the connection arrangement 14 for arming the escape slide 13, when the passenger door 11 is in the raised state, in four steps, is explained with reference to FIGS. 2*a*-2*d*.

When the passenger door 11 is in the raised state shown in FIG. 2*a*, before the transition from disarming to arming of the escape slide 13, the girt bar 12 is fastened to the passenger door 11 via the locking bolt connected to the actuating element 15. The locking bolt in this case is arranged relative to the external engagement means 14*b* such that the projections 1101*b* provided a locking bolt are in alignment with the oblong hole 142*b* of the external engagement means 14. A movement of the girt bar 12 in the y direction and z direction is prevented by a fixing element 103 fastened to the passenger door 11.

Figure 2B:
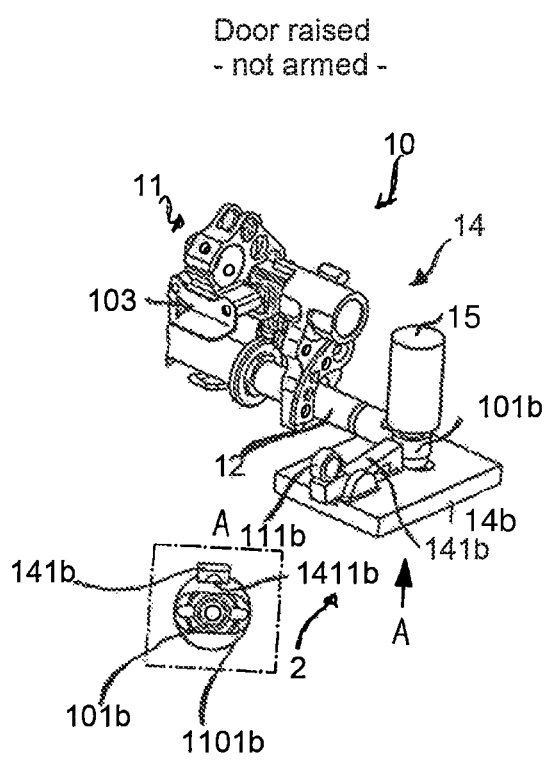

If then, as shown in FIG. 2*b*, the passenger door 11 is lowered relative to the fuselage portion 2, the mechanism 101*b* implemented in the form of a locking bolt comes into rotational engagement with the external engagement means 14*b*, i.e., the locking bolt is lowered into the oblong hole 142*b*, such that the projections 1101*b* realized on the locking bolt can be received in the oblong hole 142*b*. In addition, the positioning element 111*b* presses the first end of the tilt element 141*b* downwards, such that the second end of the tilt element 141*b* is raised. As a result, a state of readiness for receiving the rotational engagement of the locking bolt is established.

When the passenger door 11 is closed, locked and secured, the escape slide 13 can be armed manually from the inside by the selector lever mechanism 4. The necessary force is transmitted from the selector lever mechanism 4, by means of the Bowden cable and the actuating element 15, to the lower interface region of the escape slide kinematics. In particular, the arming of the escape slide 13 is effected by a rotation of the actuating element 15 by 90° about the longitudinal axis L of the mechanism 101*b* realized in the form of a locking bolt, the rotation of the actuating element 15 being transmitted, by a profile 104, to the mechanism 101*b* realized in the form of a locking bolt. The profile 104 comprises a projection 105 realized on the locking bolt, and a receiver 106, which is realized on the actuating element 15 and which is complementary to the projection 105.

Figure 2C:
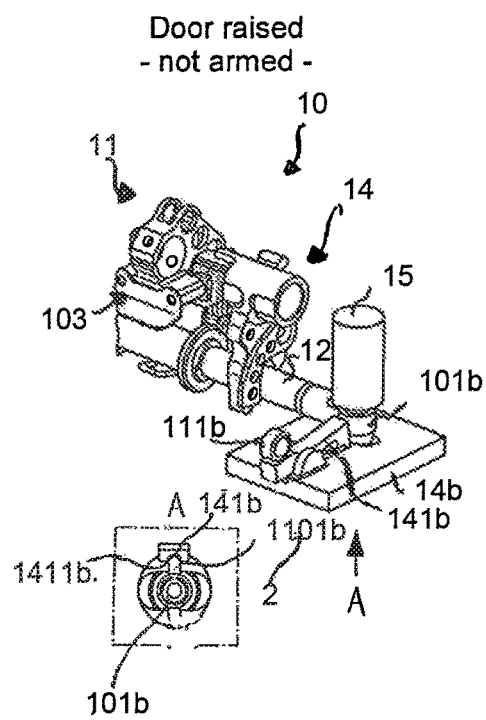

As a result of the rotation of the locking bolt, the projections 1101*b* realized on the locking bolt are blocked/offset against the external engagement means 14*b*, i.e., one of the projections 1101*b* comes into engagement with the recess 1411*b* realized at the second end of the tilt element 141*b* (cf. FIGS. 2*c* and 2*d*, plan view A from below). As a result, the locking bolt, when it has attained the position illustrated in FIG. 2*c*, is fixed and thus establishes a rotational engagement with the oblong hole 142*b*.

Figure 2D:
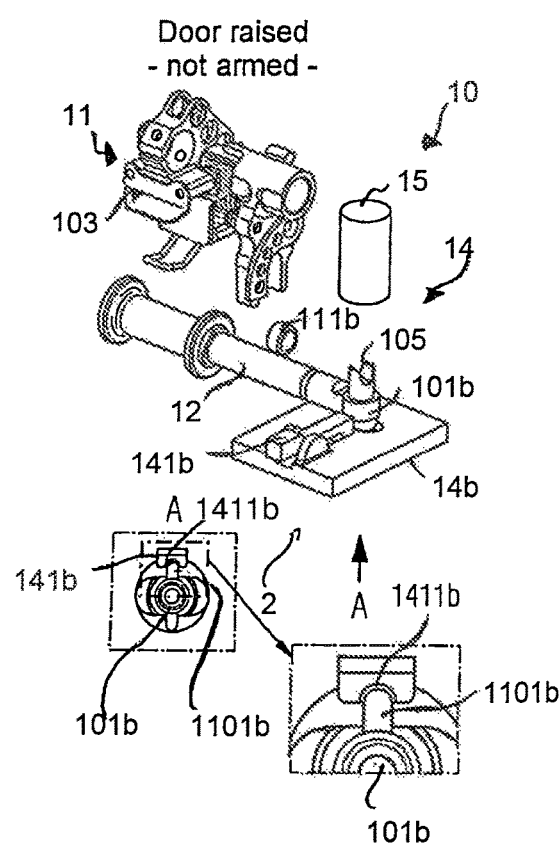

If the passenger door 11 is then raised, as illustrated in FIG. 2*d*, the components of the connection arrangement 14 fixed to the passenger door 11 are released from the components of the connection arrangement 14 that are fixed to the fuselage portion 2. In particular, the positioning element 111*b* is raised from the first end of the tilt element 141*b*, the tilt element 141*b*, however, being held in its position by the recess 1411*b*, realized at the second end of the tilt element 141*b*, acting in combination with one of the projections 1101*b* realized on the locking bolt. At the same time, the actuating element 15 is released from the mechanism 101*b*, realized in the form of a locking bolt, which, for its part, remains in rotational engagement with the external engagement means 14*b*, i.e., with the oblong hole 142*b* of the external engagement means 14*b*. As a result, the girt bar 12, which is rigidly connected to the locking bolt, is fixed on the fuselage portion 2. The escape slide 13 is thus securely attached to the structure of the aircraft segment 1 for use. Accordingly, the fixing element 103 can be released from the girt bar 12.

The passenger door arrangement 10 described here is advantageous in at least some of the following points:

Lesser weight, owing to the reduced number of parts in the mechanism for arming (in particular owing to the use of the Bowden cable).

The girt bar always maintains the same position in relation to the escape slide, the door and the fuselage. Only the slide (as secondary interface) is transferred during the operation for arming/disarming, instead of the girt bar (as primary interface) during the operation for arming/disarming.

Reduced complexity of the mechanism for arming, with a positive effect on the production and assembly time.

More robust interface between the door, girt bar and fuselage in respect of handling and tolerance effects.

Fewer interruptions of production and servicing times.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft segment, comprising
a passenger door, which can be moved relative to a fuselage portion that accommodates the passenger door, between a raised position and a lowered position, and
a girt bar, for arming or disarming an escape slide, which can be connected to at least one of the passenger door or to the fuselage portion by a connection arrangement,
the connection arrangement being configured, in case of arming of the escape slide, to hold the girt bar fixed relative to the passenger door when the passenger door is in the lowered position, the connection arrangement comprising:
   a mechanism that is configured to releasably lock and fix the girt bar to an external engagement means that can be fastened to the fuselage portion, wherein the mechanism is a locking bolt, which is attached to an end of the girt bar and which is configured to go into rotational engagement with the external engagement means;
wherein the connection arrangement comprises a positioning element, which is fastened to the passenger door and which is configured to put the external engagement means into a state of readiness to receive the rotational engagement of the locking bolt, when the passenger door is in a lowered state,
wherein the external engagement means is fixed to the fuselage portion,
wherein the external engagement means additionally comprising a tilt element, which comprises a first end, on one side of a lever arm, and a second end, on the other side of the lever arm,
wherein the first end of the tilt element being arranged opposite the positioning element,
wherein the second end of the tilt element projects into the oblong hole, wherein in a first position within the oblong hole the second end of the tilt mechanism is configured to prevent the state of readiness of the connection arrangement to receive the rotational engagement of the locking bolt, and
wherein the positioning element being configured, in case of lowering of the passenger door, before the transition from disarming to arming of the escape slide, to press the first end of the tilt element downward, such that the second end of the tilt element is raised to a second position in order to establish the state of readiness to receive the rotational engagement of the locking bolt.

2. The passenger door arrangement according to claim 1, further comprising the connection arrangement being configured to at least one of
   connect the girt bar to the passenger door when the escape slide is in a disarmed state, or
   connect the girt bar to the fuselage portion when the escape slide is in an armed state.

3. The passenger door arrangement according to claim 1, wherein the mechanism is connected to the girt bar in such a manner that the mechanism does not alter its position relative to the girt bar.

4. The passenger door arrangement according to claim 1, wherein
   the mechanism is configured to be fastened to the passenger door when the passenger door is in a raised state, before and during a transition from disarming to arming of the escape slide, when the passenger door is in a lowered state, and
   the mechanism is configured to release from the passenger door following arming of the escape slide, as the passenger door is placed in the raised state.

5. An aircraft segment, comprising the passenger door arrangement according to claim 1, and
   the fuselage portion an external engagement means being fixed to the fuselage portion.

6. The aircraft segment according to claim 1, wherein
   the second end of the tilt element additionally comprises a recess having a shape corresponding to one of the projections of the locking bolt, and
   the recess is configured, in the case of lowering of the passenger door, following the transition from disarming to arming of the escape slide, to go into engagement with the one of the projections, such that the locking bolt is fixed.

* * * * *